No. 720,176. PATENTED FEB. 10, 1903.
G. N. PERRY.
SOIL SCRAPER.
APPLICATION FILED OCT. 29, 1902.
NO MODEL.
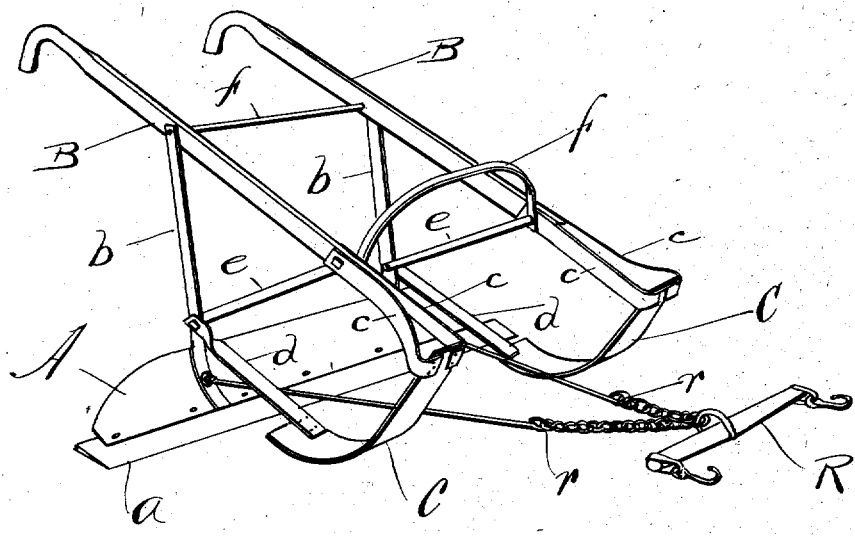
Witnesses
Inventor.
George N. Perry.
By
Arnold & Barton
Attorneys

UNITED STATES PATENT OFFICE.

GEORGE N. PERRY, OF FOWLER, CALIFORNIA, ASSIGNOR OF ONE-HALF TO JOSEPH D. DEXTER, OF SAN DIEGO, CALIFORNIA.

SOIL-SCRAPER.

SPECIFICATION forming part of Letters Patent No. 720,176, dated February 10, 1903.

Application filed October 29, 1902. Serial No. 129,244. (No model.)

*To all whom it may concern:*

Be it known that I, GEORGE N. PERRY, a resident of Fowler, in the county of Fresno and State of California, have invented certain new and useful Improvements in Soil-Scrapers; and I do hereby declare that the following is a full, clear, and exact description thereof, reference being had to the accompanying drawing, and to the letters of reference marked thereon, which forms a part of this specification.

This invention relates to soil-scrapers, and has for its object to produce a scraper of special design particularly adapted for use in orchards and vineyards for forming channels or ditches between the trees or plants in which to run water for irrigating purposes.

I hereby declare the following to be a full, clear, and exact description of the invention, such as will enable others skilled in the art to which it appertains to make and use the same, reference being had to the accompanying drawing, which is a perspective view illustrating my device, and to the letters of reference marked thereon, which forms a part of this specification.

The construction and operation of my improved scraper are as follows:

A represents the scoop or scraper portion, preferably formed of sheet metal with a removable strip of hardened steel on its cutting edge a. This strip a may be sharpened and then screwed or bolted to the scraper portion, and is for the purpose of more readily severing the roots and fibers in the earth with which it may come in contact during the process of ditching.

B B are the handle-bars, preferably made of wood and located at a convenient height above and supported from the scraper A by suitable rods b b. The outer ends of these handles are connected to the shoes C C by the extension clamping-pieces c c. These shoes C drop down to about the level of and curve back toward the cutting edge of the scraper, the lower ends of which are held in place by the rods d d, which are connected to them and the supporting-rods b b. The braces e e and f f are for stiffening the frame.

R is the whiffletree, to which the horse may be hitched for drawing the scraper, and is attached to the frame by the chains and rods r r.

In many western orchards or vineyards where long dry spells of weather are prevalent it is found necessary to water or irrigate the land in order to preserve the health and stimulate the growth of the plants. It is customary to plant the vines and trees in rows a short distance apart and to plow up the ground between the rows and to dig channels or ditches lengthwise of the rows between the vines and trees, and it is for digging these channels or ditches that my improved scraper is particularly adapted, although it may be used for various other purposes of similar character.

My improvement consists mainly in the rocker-shoes C C and locating them forward of the cutting edge of the scraper, so they will slide along the top of the ground and act as a fulcrum by which to raise and lower the cutting edge of the scraper. By the use of these shoes I am able to accurately regulate the depth of cut to be taken in the soil by simply raising or pressing down on the handles B B.

This implement is found in practice to be very useful, practical, and convenient for work of this character.

Having thus described my invention, what I claim as new, and desire to secure by Letters Patent, is—

1. In a device of the character described, a scoop-blade, handle-bars attached thereto, means located forward of said scoop-blade attached to and depending from said handle-bars, forming a fulcrum by which to raise and lower said scoop-blade, substantially as described.

2. In a device of the character described, a scoop-blade, fulcrum-shoes located forward of said scoop-blade, and depending from the ends of the handle-bars by which said scoop-blade is raised and lowered fulcrumed on said shoes, substantially as described.

3. In a device of the character described, a scoop-blade having a cutting edge, handle-bars located above said scoop-blade and supported from it, fulcrum-shoes located forward of said scoop-blade and depending from the end of each handle-bar to act as a fulcrum by which to raise or lower said scoop-blade, substantially as described.

4. In a soil-scraper, a scoop-blade, handle-bars supported from and above said scoop-blade, by suitable framework at a convenient working height, fulcrum-shoes attached to outer end of said handle, bars by means of which said scoop-blade may be raised or lowered, substantially as described.

5. In a soil-scraper, a scoop-blade having a removable cutting edge, a pair of handle-bars, suitable means for supporting said handle-bars at a convenient working height above said scoop-blade, a fulcrum-shoe attached to the outer end of each handle, said shoes attached to the outer end of each handle-bar dropping down and curving back toward the cutting edge of said scoop-blade forming a fulcrum by which said scoop-blade may be rolled up or down, substantially as described.

In testimony whereof I have hereunto set my hand this 11th day of October, A. D. 1902.

GEORGE N. PERRY.

In presence of—
W. D. CRICHTON,
E. R. PERRY.

---

It is hereby certified that Letters Patent No. 720,176, granted February 10, 1903, upon the application of George N. Perry, of Fowler, California, for an improvement in "Soil-Scrapers," was erroneously issued to George N. Perry and Joseph D. Dexter, as joint owners of said invention; whereas the patent should have been granted to said *Joseph D. Dexter*, he being sole owner of the entire interest as shown by the assignments of record in the Patent Office; also that the words "one-half" in line seven of the grant, and in the heading to the printed specification should be stricken out; and that the said Letters Patent should be read with these corrections therein that the same may conform to the record of the case in the Patent Office.

Signed and sealed this 3d day of March, A. D., 1903.

[SEAL.]

F. I. ALLEN,
*Commissioner of Patents.* end of each handle-bar to act as a fulcrum by which to raise or lower said scoop-blade, substantially as described.

4. In a soil-scraper, a scoop-blade, handle-bars supported from and above said scoop-blade, by suitable framework at a convenient working height, fulcrum-shoes attached to outer end of said handle, bars by means of which said scoop-blade may be raised or lowered, substantially as described.

5. In a soil-scraper, a scoop-blade having a removable cutting edge, a pair of handle-bars, suitable means for supporting said handle-bars at a convenient working height above said scoop-blade, a fulcrum-shoe attached to the outer end of each handle, said shoes attached to the outer end of each handle-bar dropping down and curving back toward the cutting edge of said scoop-blade forming a fulcrum by which said scoop-blade may be rolled up or down, substantially as described.

In testimony whereof I have hereunto set my hand this 11th day of October, A. D. 1902.

GEORGE N. PERRY.

In presence of—
W. D. CRICHTON,
E. R. PERRY.

It is hereby certified that Letters Patent No. 720,176, granted February 10, 1903, upon the application of George N. Perry, of Fowler, California, for an improvement in "Soil-Scrapers," was erroneously issued to George N. Perry and Joseph D. Dexter, as joint owners of said invention; whereas the patent should have been granted to said *Joseph D. Dexter*, he being sole owner of the entire interest as shown by the assignments of record in the Patent Office; also that the words "one-half" in line seven of the grant, and in the heading to the printed specification should be stricken out; and that the said Letters Patent should be read with these corrections therein that the same may conform to the record of the case in the Patent Office.

Signed and sealed this 3d day of March, A. D., 1903.

[SEAL.]

F. I. ALLEN,
*Commissioner of Patents.*

It is hereby certified that Letters Patent No. 720,176, granted February 10, 1903, upon the application of George N. Perry, of Fowler, California, for an improvement in "Soil-Scrapers," was erroneously issued to George N. Perry and Joseph D. Dexter, as joint owners of said invention; whereas the patent should have been granted to said *Joseph D. Dexter*, he being sole owner of the entire interest as shown by the assignments of record in the Patent Office; also that the words "one-half" in line seven of the grant, and in the heading to the printed specification should be stricken out; and that the said Letters Patent should be read with these corrections therein that the same may conform to the record of the case in the Patent Office.

Signed and sealed this 3d day of March, A. D., 1903.

[SEAL.]

F. I. ALLEN,
*Commissioner of Patents.*